United States Patent [19]

Moss et al.

[11] 4,058,959
[45] Nov. 22, 1977

[54] GRASS CUTTING BLADES

[76] Inventors: Robert J. Moss, 6319 S. Inwood Road, Shreveport, La. 71119; Forrest G. Hurst, 417 Town South Drive, Shreveport, La. 71115

[21] Appl. No.: 620,152

[22] Filed: Oct. 6, 1975

[51] Int. Cl.² .............................................. A01D 55/18
[52] U.S. Cl. ..................................................... 56/295
[58] Field of Search .................... 56/12.7, 295, 256; 30/DIG. 5, 347

[56] References Cited

U.S. PATENT DOCUMENTS

| 2,707,859 | 5/1955 | Walker | 56/295 |
| 2,859,582 | 11/1958 | Babcock | 56/295 |
| 3,014,333 | 12/1961 | Clark, Jr. | 56/295 |
| 3,208,209 | 9/1965 | Dunlap et al. | 56/295 |
| 3,690,051 | 9/1972 | Wood | 56/295 |

FOREIGN PATENT DOCUMENTS

| 1,582,352 | 5/1970 | Germany | 56/295 |

Primary Examiner—Jay N. Eskovitz

[57] ABSTRACT

A grass cutting and trimming blade having a rigid main bar adapted for rotation either in a vertical or horizontal plane, a pair of wire forms for cutting elements removably attached one at one end of said main bar and one at the other end of said main bar, each of said cutting elements adapted for cutting grass upon being rotated by a power source and each cutting element being yieldable in the plane of rotation to prevent breakage thereof when striking an object.

3 Claims, 7 Drawing Figures

GRASS CUTTING BLADES

The present invention pertains to grass cutting blades of the rotary type wherein the blades are mounted to a power source at a point midway their lengths whether in a vertical or horizontal plane and thus rotated to mow or trim grass.

One of the main objects of the invention is the provision of a mower blade which never needs sharpening wherein the actual cutting portion of the blade consists in a unique wire form which may be attached and removed for service without removing the main supporting bar from the mower. In the form of mower blade now known, it must be removed from the mower for filing or grinding to keep its cutting edge. The normal household does not usually hve the proper tools for such an operation, hence the entire mower must be taken to the repair man. Even when such filing can be done by the home mechanic, it is not long before one end of the blade is filed more than the other and the entire blade is out of balance, causing a vibration in the mechanism which is detrimental to both the mower engine and its framework. Moreover the user of a lawn mower has the extremely bad habit of extending his hand under the mower housing and running his finger along the edge of the cutting blade to test its sharpness. This is not necessary with the present invention. If the cutting elements of the present invention are in place they are ready for service and are always "sharp."

Another object of the invention is the provision of a mower blade wherein the cutting elements of the blade are yieldable in their direction of rotation so that if one or both of them strike an object such as rock or stump they will yield around such object without causing a shock in the engine drive mechanism. Such action is also a considerable safety feature since many accidents have occurred to a user's feet and hands caused by an unyielding sharp end of a mower blade.

A still further object of the invention is the provision of inexpensive cutting elements. Whereas former blades have been removed from the mower by the repair man for sharpening at considerable time and expense, in the present invention the user simply unsnaps the cutting elements and replaces them with a new set in a matter of seconds and for far less cost than having them ground by a repair man.

A separate form of the above-mentioned blade is found in the attached drawings wherein the wire formed cutting elements are not only pivotally mounted and removably attached to the main cutting bar ends, but wherein they may be folded inwardly of the blade ends and locked in a non-operative position. Here, also, the cutting elements may be easily attached and removed from the main cutting blade.

Other objects and advantages of the invention will become apparent in the course of the following detailed description of the invention when viewed together with the accompanying drawing in which.

Figure 1:
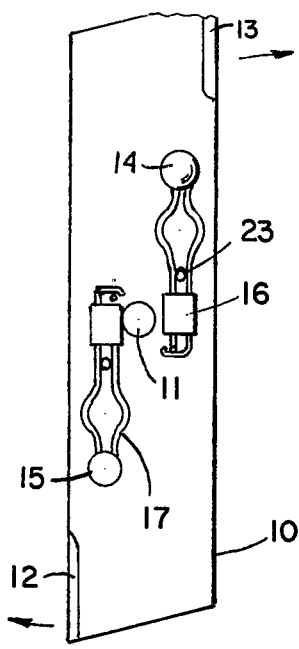
FIG. 1 is a view of one form of the present invention in a grass cutting blade, this view illustrating the blade formed for rotating in a vertical plane and showing the cutting elements folded together in a non-operative position.
Figure 2:
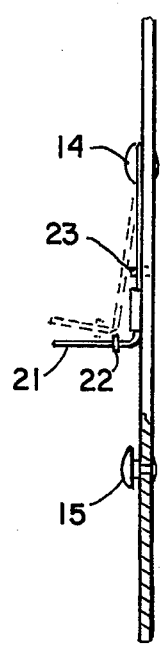
FIG. 2 is a broken edge view of the invention illustrated in FIG. 1.
Figure 4:
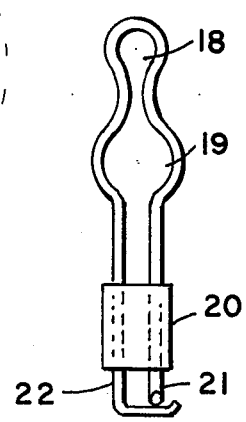
FIG. 4 is a plan view of one of the cutting elements of FIG. 1.

In FIG. 1 of the drawing, which illustrates one form of the invention, numeral 10 designates a main bar of thin, flat metal. While this bar could be used as one adapted to cut in a horizontal plane, it is preferred that it be used in a vertical plane such as on a conventional edging machine. The bar is provided with a hole 11 midway its length by which the same is mounted to the rotatable shaft of the power source. The bar is sharpened at its opposite ends and on opposite sides as 12 and 13. Positioned at equal distances on the bar from the central hole 11 are rivets 14 and 15 which serve as a pivot point for a pair of cutting elements 16 and 17 the construction of which is more clearly seen in the enlarged view of FIG. 4. Here, in a plan view, the cutting element consists in a single wire formed into a primary loop 18 of a diameter corresponding to, or even slightly less than, the diameter of the shank portion of its corresponding rivet 15, and a secondary looped portion 19, normally slightly larger than the head diameter of the rivet 15. Such construction allows the loop 19 to be slipped over the head of the rivet encircling the rivet shank and then permits the wire to be forced over the rivet shank into the smaller loop diameter 18 and hence into a mounted position. The wire form is extended further beyond the loop 19 in the same plane for a short distance as shown in FIG. 4 where both extended legs are clamped firmly together by a clamp 20. Beyond the clamp 20 both extended legs of the wire form are bent at an angle of 90° as shown in FIG. 2. One of the extended legs 21 serves as a principle cutting portion of the cutting element while the other extended leg 22 is positioned under the first leg 21 to serve as a yieldable support during the actual cutting operation of the element.

Reference is again made to FIG. 1 which shows the assembly of the above described bar in a folded, nonoperative position and located in such position against rotative movement by a pin 23. With the cutting elements 16 and 17 in such folded position as shown here, the device may be mounted on a grass edger and used in the conventional manner; the blade being rotated by its power sources in the direction of the arrows and with the cutting edges 12 and 13 of the main bar 10 slicing the grass in a vertical plane. Such action is found in edgers of the former art.

However, let it be assumed that a user wishes to trim around a stationary object such as a tree or shrub. With the present invention the cutting elements 16 and 17 are simply folded outwardly by lifting the yieldable spring wire over the stop member 23 and rotating the element around the pivotal holding members 14 and 15. Such movement is clearly seen by the dotted lines of FIGS. 2 and 3.

Figure 3:
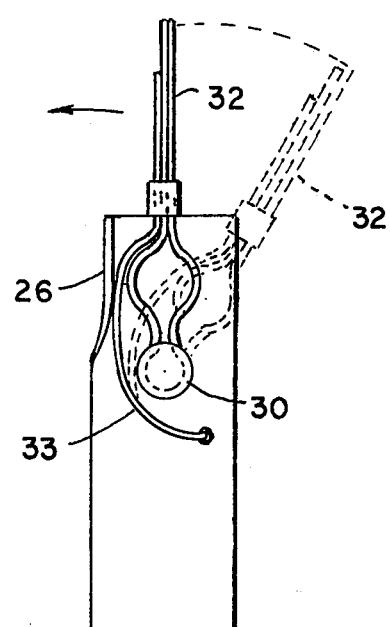
FIG. 3 is a broken view of the device illustrated in FIG. 1 but showing the manner in which the cutting elements may be pivotally moved into a cutting position.
Figure 3:
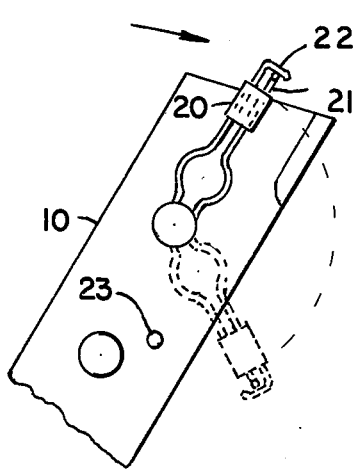

Each cutting element now assumes the position of the one illustrated in FIG. 3 with the weight and mass of the extended legs 21 and 22, plus the weight of the clamp 20 acting by centrifugal force to maintain the blade in a cutting position lying along the central axis of the bar 10. Thus the device is made to trim a band of grass with the transversely positioned cutting elements while the main bar 10 is still rotating in a vertical plane. This is highly desirable since such action precludes the re-positioning of the main bar by an additional adjustment to the driving mechanism.

Another great advantage of the present invention over those of the prior art is the cost of maintaining the bar for clean cutting section. As aforementioned, it is only necessary to "unsnap" the cutting elements as formerly described, place a new set into position, and the device is ready for service again. There is nothing to unbolt or to file.

Figure 6:
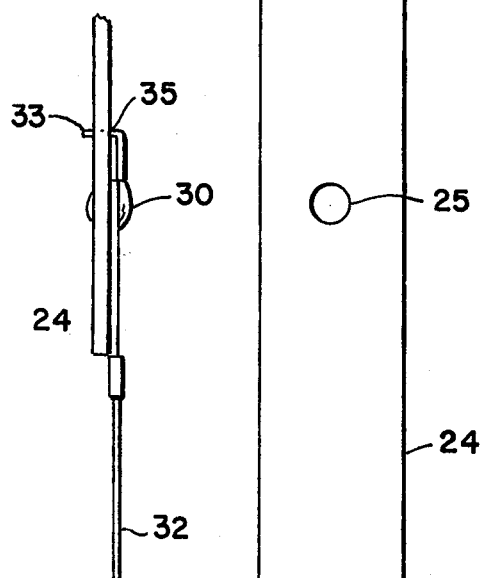
FIG. 6 is a broken edge view of the blade taken along lines 6—6 of FIG. 5.
Figure 7:
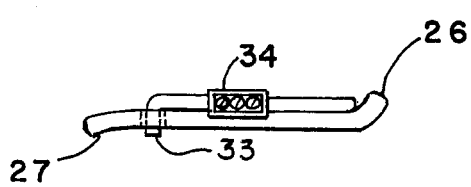
FIG. 7 is a cross sectional view taken along lines 7—7 of FIG. 5.
Figure 5:
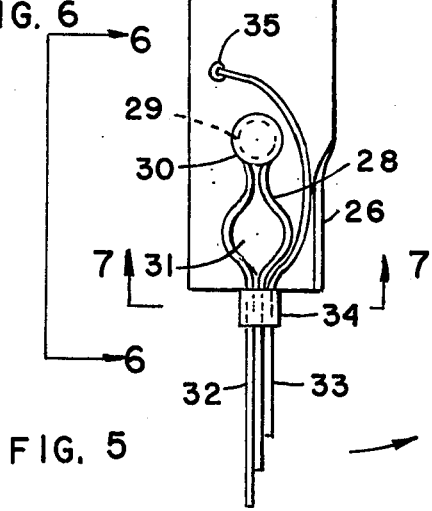
FIG. 5 is a view of another form of the grass cutting blade shown in FIG. 1; this blade being adapted to rotate in a horizontal plane when cutting grass.

FIG. 5 illustrates another form of the invention. Here, the main bar 24 is considerably longer than the one of the type described above since the bar is adapted for use on a conventional rotary type drive mechanism rotating the bar in a horizontal plane. The bar is provided, in this instance, with a hole 25 midway its length suitable for receiving the driving shaft of a mower engine. The construction at each end of the bar is similar and, as shown in FIGS. 5 and 7, the bar is provided with rolled edges 26 and 27, one turned in one direction and the other in the opposite direction; the rolled edges serving as air vanes to lift the grass as the bar is rotated. This feature is common to all horizontal cutting bars in the former art. In the present instance, however, one of the edges 26 also serves as a stop member for a grass cutting element designated generally by the numeral 28. This cutting element is also constructed of wire similar to that of the formerly-described element. It also has a primary loop 29 of a diameter slightly less than the shank diameter of a rivet 30 which serves as a pivotal mounting member for the cutting element 28. This element is also provided with a secondary looped portion 31 of a diameter slightly greater than the head diameter of the rivet 30. The two legs forming the last mentioned loop 31 are extended outwardly along the same plane and constitute the main cutting portion 32 of the cutting element 28. It will be noted that the cutting portion 32 contains a third leg 33 which lies in a position with the two other leg members and held in such position by a clamp 34. This leg is passed through the clamp 34 and follows a circuitous route where the end thereof is finally turned inwardly at 90 degrees into a prepared hole 35. It will be noted that one edge of the wire form lies adjacent the upturned rolled edge 26 of the main bar 24. Such construction is more clearly seen in FIG. 6.

When in use, the main bar 24 will rotate in the direction of the arrows in FIG. 5. While rotating in this direction, should the cutting element 32 strike an object, it will simply pivot around its mounting rivet 30 and move into a position as shown by the dotted lines of FIG. 5. This action, of course, puts a stress on the third leg member 33, pulling it away from the stop member 26. As soon as the cutting element is free of the object, it will again return to its normal cutting plane and position as shown at the bottom of the view of FIG. 5. This return is not only accomplished by the centrifugal force setting on the mass of the cutting element, but is also assisted by the energy force in the spring wire leg member 33.

This cutting element 28 is simple in its construction and inexpensive in cost. It also may be easily removed from the main bar 24 by lifting the end of the third leg member out of the hole 35 and forcing the restricted primary loop 29 out of its position to where the head of the rivet 30 will coincide with the larger secondary loop 31.

While we have described in detail in two particular embodiments, it is to be understood that this has been by way of example and that other changes could be made without departing from the scope of the invention as defined by the following claims.

I claim:

1. A grass cutting blade comprising a main bar of thin flat metal, a grass cutting element one on each end of said main bar, each of said cutting elements being both removably and pivotably attached to said main bar, each of said cutting elements being made of a spring wire material having preformed loops in the wire, said cutting elements being also provided with legs extended in a plane parallel to the plane of said main bar and said loop section said legs having end sections which are bent substantially 90° away from the plane of said main bar, an anchoring rivet on each end of said bar one for each of said cutting elements, each of said elements being rotatable around its anchoring rivet from a folded non-operative position to an operative position with the legs of each element extending beyond the extreme ends of said main bar.

2. A grass cutting blade adapted for rotation in a vertical plane by an edger trimmer comprising a main bar of thin flat material, means for attaching said bar to a power source, a pair of grass cutting elements one at each end of said main bar, said cutting elements consisting in a spring wire form with each being both removable and pivotally attached to said main bar, each of said elements provided with extended legs bent outwardly from the plane of said main bar for a cutting operation by said extended legs in a horizontal plane, while said bar is rotating in a vertical plane and means for locking said cutting elements in a folded non-operative position.

3. A grass cutting blade comprising a main bar, mounting rivets on said bar, one positioned at each end of the same, each rivet having a shank portion with an enlarged head, a pair of cutting elements one for each rivet, each of said cutting elements consisting in a spring wire bent upon itself to form a partially closed loop of such diameter as to permit said loop by being stretched as a spring to grip the shank portion of its rivet beneath the head thereof yet permit the same to be moved in pivotal action when being acted upon by some outside force, said wire being also bent into a second partially closed loop contiguous with said first mentioned loop and of a diameter slightly larger than the diameter of the head of said rivet to permit removal of said cutting element from said rivet when said second loop is moved into coincidence therewith, the legs of said cutting elements being bent in a substantially 90° plane away from their normal mounting plane on said main bar.

* * * * *